US006925690B2

(12) United States Patent
Sievers

(10) Patent No.: US 6,925,690 B2
(45) Date of Patent: Aug. 9, 2005

(54) BULLSNAP

(75) Inventor: Jack D. Sievers, Indianapolis, IN (US)

(73) Assignee: JT International Distributors Inc., Indianapolis, IN (US)

( * ) Notice: Subject to any disclaimer, the term of this patent is extended or adjusted under 35 U.S.C. 154(b) by 0 days.

(21) Appl. No.: 10/614,490

(22) Filed: Jul. 7, 2003

(65) Prior Publication Data

US 2005/0005408 A1 Jan. 13, 2005

(51) Int. Cl.$^7$ .......................... F16B 45/02; A44B 13/00
(52) U.S. Cl. .................... 24/599.1; 24/599.4; 24/598.4
(58) Field of Search ............................. 24/599.4, 599.1, 24/598.7, 599.6, 592.1, 592.11, 582.11, 588.1, 24/588.11, 601.5; 294/82.19, 82.2

(56) References Cited

U.S. PATENT DOCUMENTS

| 28,669 | A | * | 6/1860 | Henshaw ................... 24/599.5 |
| 311,791 | A | * | 2/1885 | Spielman ................... 24/599.4 |
| 565,520 | A | * | 8/1896 | Stilson ...................... 24/599.4 |
| 848,603 | A | | 3/1907 | Read |
| 878,060 | A | | 2/1908 | Hammond |
| 896,084 | A | * | 8/1908 | Calvert ..................... 24/599.4 |
| 1,276,008 | A | | 8/1918 | Baxter |
| 1,276,010 | A | | 8/1918 | Baxter |
| 1,276,012 | A | | 8/1918 | Baxter |
| 1,456,264 | A | | 5/1923 | Billmeyer |
| 1,473,983 | A | * | 11/1923 | White ..................... 294/82.21 |
| 1,599,087 | A | | 9/1926 | Greve |
| 1,605,799 | A | | 11/1926 | Ver Valen |
| RE16,613 | E | | 5/1927 | Moody et al. |
| 1,626,866 | A | | 5/1927 | Neilson |
| 1,672,710 | A | * | 6/1928 | Chittenden ............... 294/82.19 |
| 1,877,702 | A | | 9/1932 | Clair |
| 2,215,049 | A | | 9/1940 | Minor |
| 2,559,999 | A | | 7/1951 | Regan et al. |
| 2,568,939 | A | | 9/1951 | Wilson |
| 2,608,812 | A | | 9/1952 | Hutchings |
| 2,650,403 | A | | 9/1953 | Taylor, Jr. et al. |
| 2,666,244 | A | | 1/1954 | Carmichael |
| 2,732,244 | A | | 1/1956 | Gaines |
| 2,927,358 | A | | 3/1960 | Ratcliff |
| 3,105,280 | A | | 10/1963 | Davis |
| 3,114,955 | A | | 12/1963 | Ahlquist |
| 3,167,346 | A | | 1/1965 | Miller |
| 3,194,598 | A | | 7/1965 | Goldfuss |
| 3,194,602 | A | | 7/1965 | Gootwald, Jr. |
| 3,317,972 | A | * | 5/1967 | Harley ...................... 24/599.4 |
| 3,798,716 | A | | 3/1974 | Klein |
| 4,050,730 | A | * | 9/1977 | Tada et al. ................. 294/82.2 |
| 4,118,840 | A | * | 10/1978 | Fengels ..................... 24/599.5 |

(Continued)

*Primary Examiner*—Robert J. Sandy
(74) *Attorney, Agent, or Firm*—John S. Reid

(57) ABSTRACT

The bullsnap fastener includes a rigid elongate member having a mid-section, a hook mounted to one end of the mid-section, a gate closing the hook, and an eye mounted to an opposite end of the mid-section. The hook has a shank and a curved distal end. The hook extends from a first end of the mid-section so as to define a hook space between the shank and the distal end, and an opening between the distal end of the hook and the first end of the mid-section. At least one grip-enhancing member is mounted to and protrudes outwardly of the gate.

16 Claims, 6 Drawing Sheets

U.S. PATENT DOCUMENTS

| | | |
|---|---|---|
| 4,372,016 A | 2/1983 | LaViolette et al. |
| 4,689,859 A | 9/1987 | Hauser |
| 4,977,647 A | 12/1990 | Casebolt |
| 5,329,675 A * | 7/1994 | McLean et al. ............ 24/599.6 |
| 5,791,025 A * | 8/1998 | Maurice et al. .......... 24/582.11 |
| 5,860,198 A | 1/1999 | Buntin, Jr. |

* cited by examiner

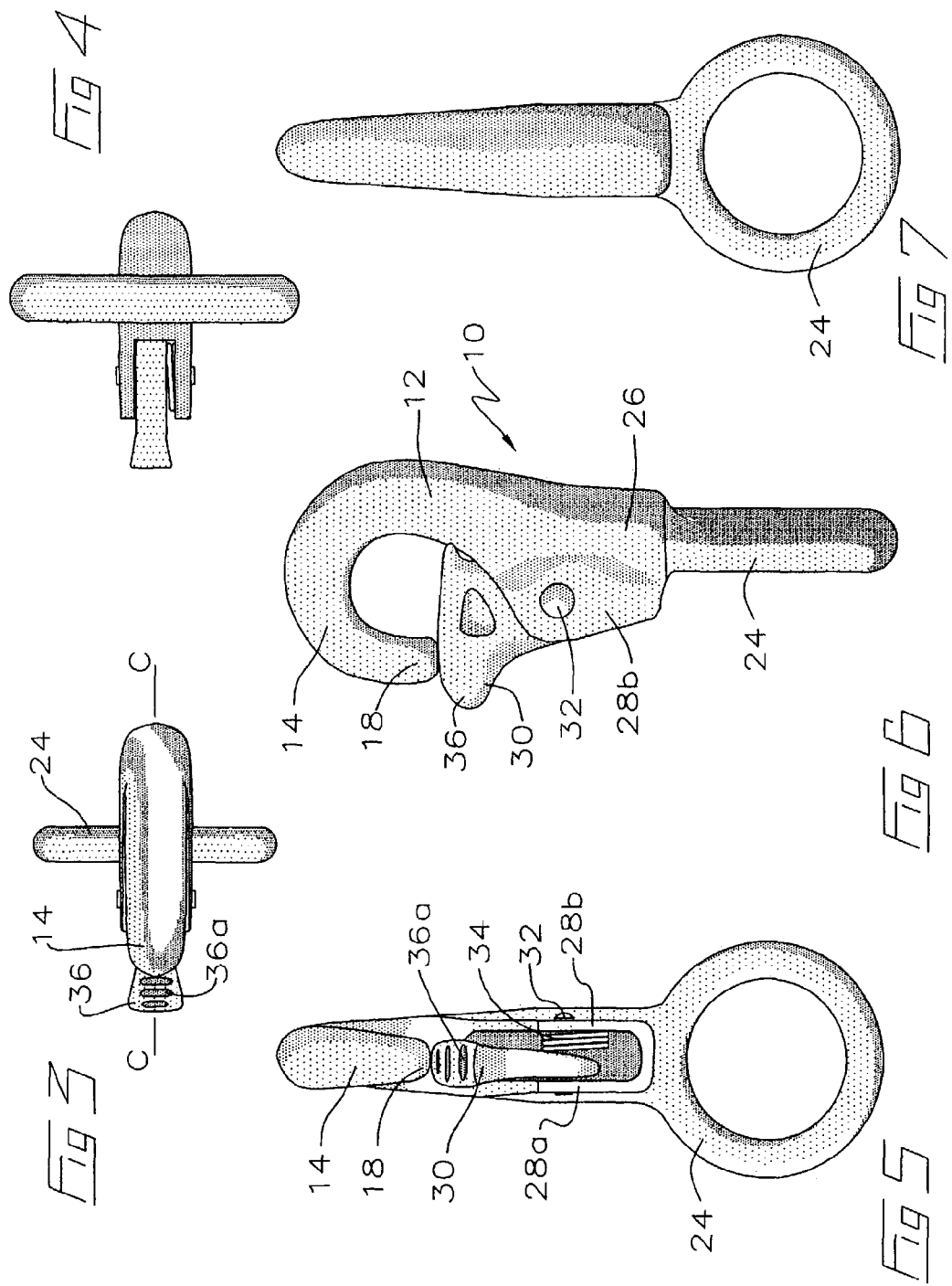

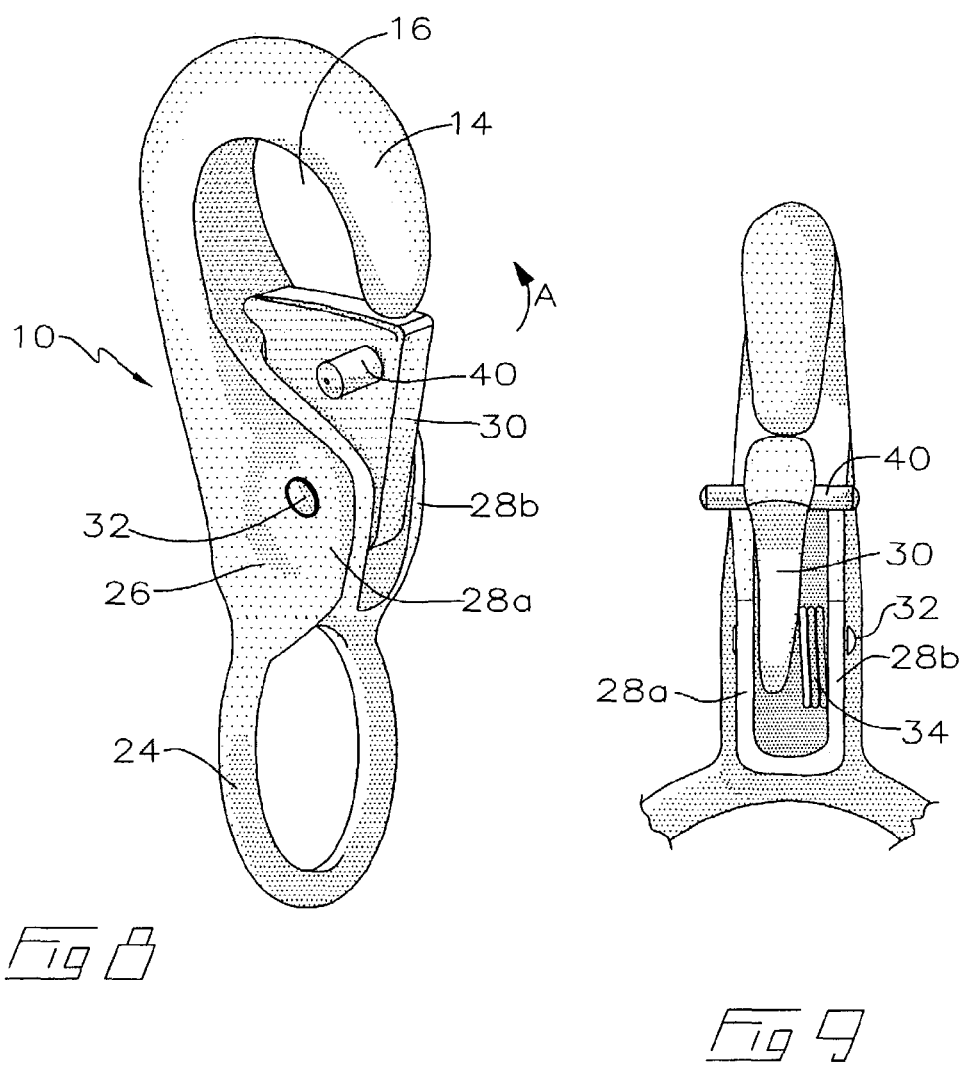

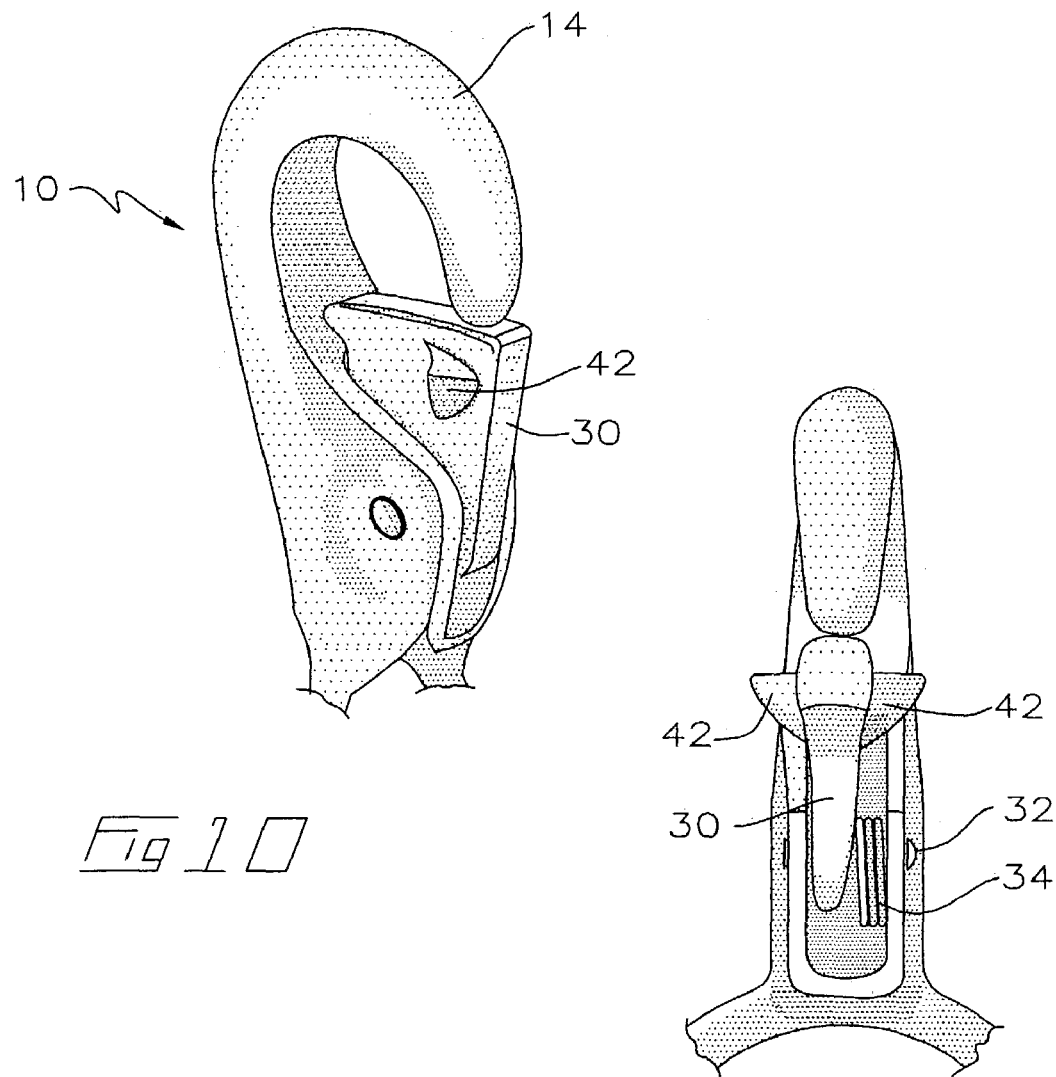

BULLSNAP

FIELD OF THE INVENTION

This invention relates to a connecting device having at one end a retaining ring or eye and at the other end an open hook, the mouth of which is closable by a spring loaded gate, such connector commonly referred to as a bullsnap.

BACKGROUND OF THE INVENTION

Connecting devices for rapidly securing one end of a lanyard or chain to a ring such as may be located at the prow of a watercraft, or secured to the collar, halter or harness of animals are in common use. Such devices may employ at one end an eye which is either fixedly or rotatably secured to the body of the connector to which a rope, lanyard or chain is secured. The opposite end of the body is formed as a robust hook, the open mouth of which is generally closable by a gate which is pivotally mounted to the body and spring urged so as to firmly engage the distal end of the hook. It is common to manufacture such devices by several different methods such as forging, moulding or stamping and to manufacture separate components such as the body, the gate and the eye, which are then assembled into the connector.

It is often advantageous during the attachment or release of the bullsnap for the gate to be readily operable by the fingers of the hand in which it is held. In situations where the bullsnap is utilized to secure animals, the user generally must grasp the collar or halter on the animal with one hand so as to position a retaining ring on the collar or halter in an unobstructed alignment for ready engagement with the hook of the bullsnap. The user must then hold the gate of the bullsnap in an open position against the tension of the spring, advantageously with the hand in which it is grasped, in order that the mouth of the hook may be aligned with the retaining ring. It is further advantageous for the gate of the bullsnap to be operable in a manner that keeps ones fingers outside the hook and clear of the opening between the hook and the gate.

It is therefore an object of the present invention to provide a bullsnap in which a gate is pivotally mounted to the body and resiliently urged toward the body so as to firmly engage the distal end of the hook to thereby close the mouth of the hook, and to provide that the gate may be readily opened by rotating the gate in a direction outwardly from the hook and held open against the return biasing force of the spring or other resilient biasing means, by either the thumb or forefinger of the hand of the user in which the bullsnap is grasped.

SUMMARY OF THE INVENTION

The present invention is bullsnap having a robust body or mid-section with an open hook formed at a first end, and an eye formed at the opposite second end. The distal end of the hook is spaced from the body so as to create a mouth or opening. A gate is pivotally mounted to the body and is rotatable from and within the mouth of the hook where it is normally spring urged to a closed position in firm contact against both the shank and distal end of the hook. The eye formed at the opposite second end, may be integrally formed with the body so as to be disposed at right angles to the hook or it may alternatively be rotatably attached to the body in the manner of a swivel.

Manual rotation of the gate against the return biasing force of the spring is facilitated, in one manner, by extending the gate radially beyond the distal end of the hook to create a thumb or finger ledge, which is conveniently operable by either hand. Alternatively, a pin or wings may be fixed through the gate to extend laterally outwardly of either side of the gate, adjacent to the distal end of the hook, where such pin or wings can be readily contacted by the thumb or forefinger of either hand to facilitate opening of the gate.

In summary, the bullsnap fastener of the present invention includes a rigid elongate member having a mid-section, a hook mounted to one end of the mid-section, a gate closing the hook, and an eye mounted to an opposite end of the mid-section.

The hook has a shank and a curved distal end. The hook extends from a first end of the mid-section so as to define a hook space between the shank and the distal end, and an opening between the distal end of the hook and the first end of the mid-section. At least one grip-enhancing member is mounted to and protrudes outwardly of the gate. The eye extends from a second end of the mid-section generally opposite the first end.

The rigid gate member is pivotally mounted to the mid-section. Resilient biasing means is mounted in the mid-section for resiliently biasing the gate from an open position into a closed position. The gate lies substantially in a plane containing the hook so as to be pivotable between the closed and open positions. In the closed position an end surface of the gate blocks the opening and closes off the hook space. The end surface extends from the opening to the shank of the hook. In the open position the gate has been pivoted outwardly of the opening, away from the hook, so as to unblock the opening allowing access to the hook space.

BRIEF DESCRIPTION OF THE DRAWINGS

FIG. 3 is atop view of the present invention.

FIG. 4 is a bottom view of the present invention.

FIG. 5 is a front view of the present invention.

FIG. 6 is right side elevation view of the present invention.

FIG. 7 is a rear view of the present invention.

FIG. 8 is a perspective view of an alternative form of bullsnap fastener according to the present invention.

FIG. 9 is a front view of the bullsnap of FIG. 8.

FIG. 10 is a perspective view of an alternative form of bullsnap fastener according to the present invention FIG. 11 is a front view of the bullsnap of FIG. 10.

DETAILED DESCRIPTION OF EMBODIMENTS OF THE INVENTION

Figure 2:
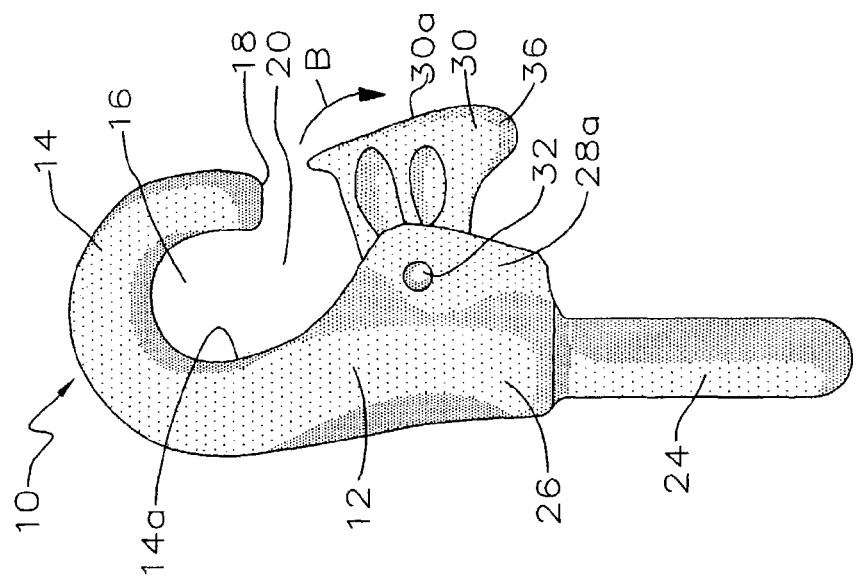
FIG. 2 is a left side elevation view of a bullsnap fastener according to the present invention, in an open aspect.

With reference to the drawing figures, wherein similar characters of reference denote corresponding parts in each view, the bullsnap 10 has a body 12 which has an elongated, tapered hook 14 forming a hook space 16. The distal end 18 of hook 14 is spaced from the adjacent surface of body 12 to create an opening or mouth 20. Eye 24 is in one embodiment not intended to be limiting, integrally formed with body 12 at base end 26. Eye 24 may also be swivel mounted.

Body 12 is bifurcated adjacent to both mouth 20 and distal end 18 of hook 14, (see FIGS. 5, 8 and 9) so as to form a parallel pair of flanges or receiving arms 28a and 28b. A gate 30 is pivotally or otherwise rotatably mounted within receiving arms 28 on rivet 32 for rotation in plane C. Helical spring 34 urges gate 30 in direction A toward a normally closed position where an upper surface 30a of gate 30 firmly engages distal end 18 of hook 14 so as to close mouth 20. When gate 30 is in its closed position surface 30a extends across hook space 16 from distal end 18 to shank 14a of hook 14 so that an object held in the hook space will not ordinarily by itself open gate 30 by merely pressing against surface 30a.

Figure 1:
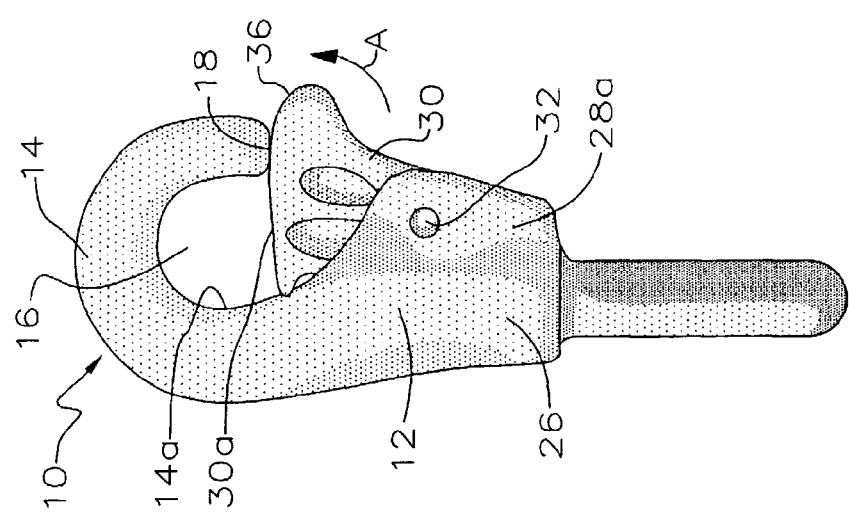
FIG. 1 is a side elevation view of the bullsnap according to the present invention, in a closed aspect.

Gate 30 may be rotated in direction B, opposite to direction A, to an opened position by a user using only the user's thumb or forefinger of the hand holding the bullsnap. In FIGS. 1–7, the thumb or forefinger of the user pulls in direction B on an actuating protrusion such as rigid nose-shaped lever or extension 36 which projects outwardly of distal end 18. Pressure in direction B on extension 36 by either the thumb or finger rotates gate 30 outwardly of mouth 20 from its normally closed position as seen in FIG. 1 to an open position as seen in FIG. 2. Pulling on the extension may be readily accomplished often by either hand of the user. Engagement of the thumb or forefinger with extension 36 is improved by friction enhancing striations 36a.

Figure 12:
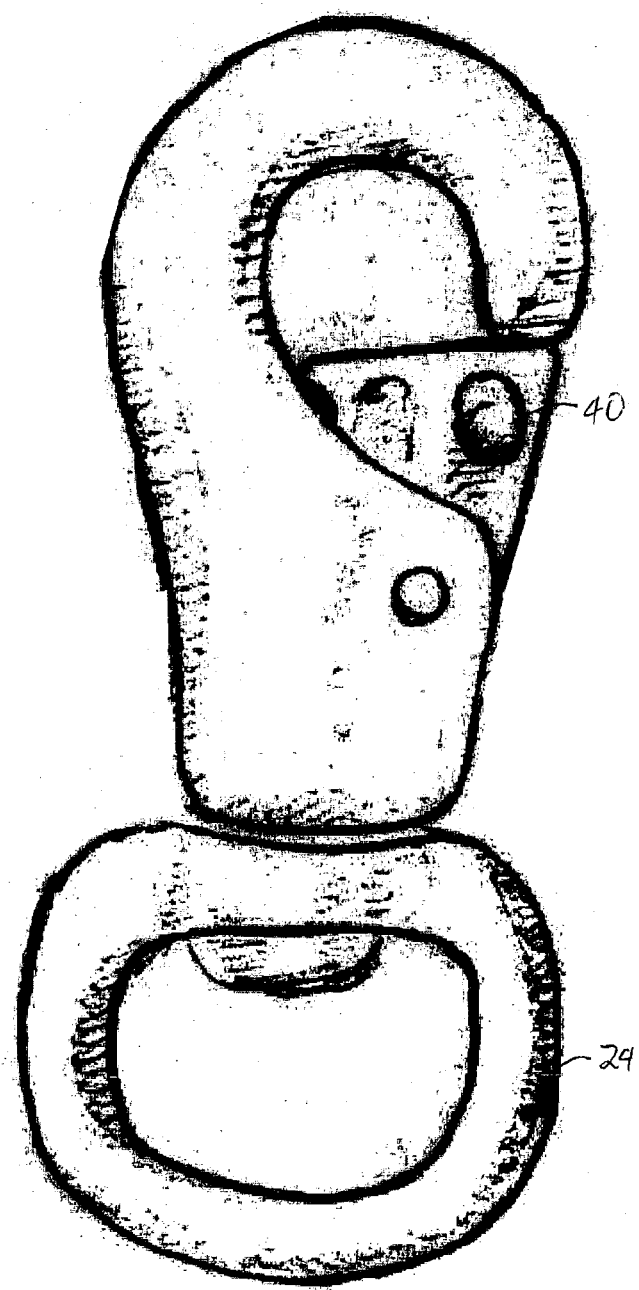
FIGS. 12 and 12a is the design of FIGS. 8 and 9 with a swivel eye.
Figure 12A:
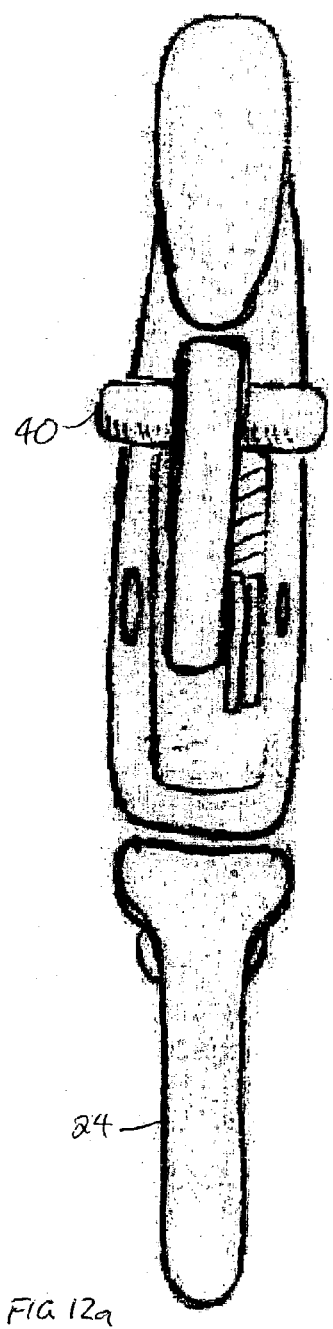
Figure 13D:
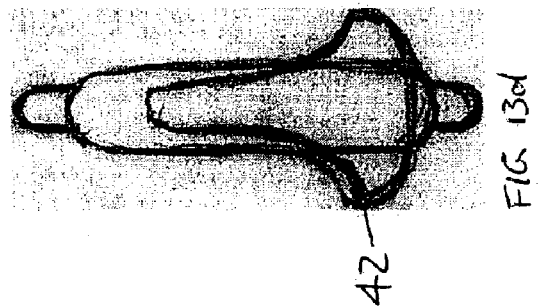
FIGS. 13a–13d is the design of FIGS. 10 and 11 with a swivel eye.
Figure 13C:
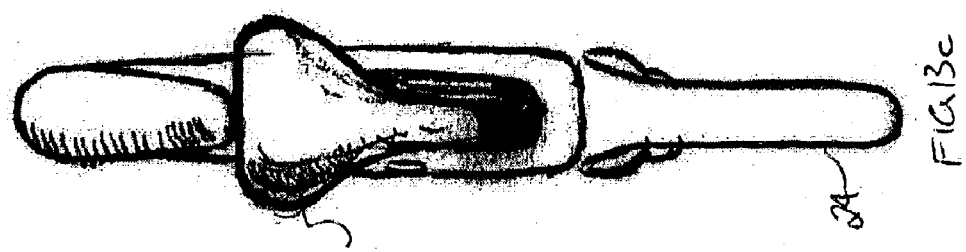
Figure 13B:
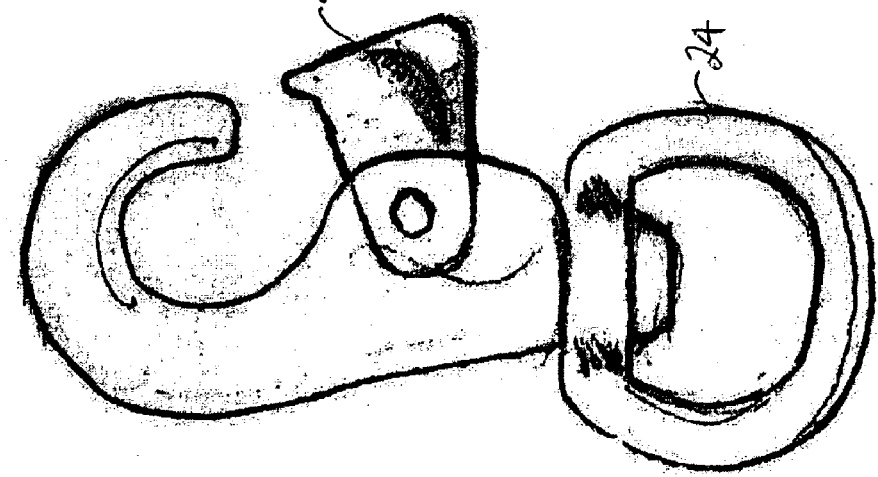
Figure 13A:
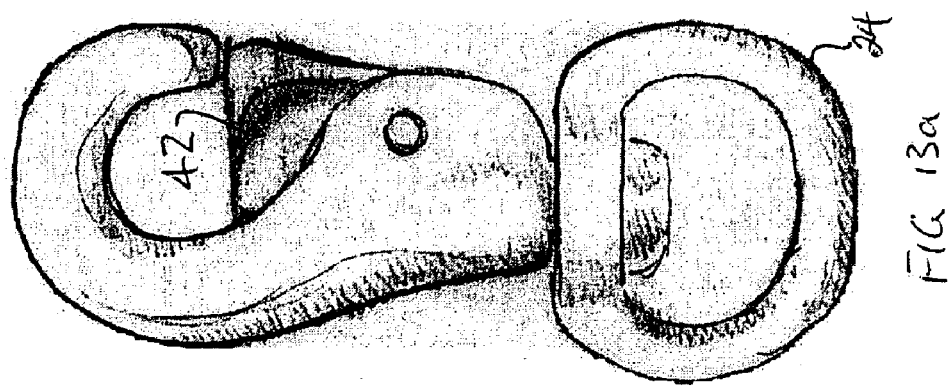

As illustrated in FIGS. 8 and 9, gate 30 may alternatively have a cantilevered pin 40 which passes through gate 30 and extends laterally and orthogonally outwardly of its opposite sides. Pin 40 is readily operable by either hand of the user, the pin being grasped and pulled to rotate gate to an open position, in direction B, against the return biasing action of spring 34. Again, as with extension 36, pin 40 provides an actuating protrusion extending outwardly of gate 30 to enable single handed operation of the gate while grasping the body of the bullsnap. FIGS. 12 and 12a illustrate the use of in 40 on an embodiment having a swivel mounted eye.

As illustrated in FIGS. 10 and 11, gate 30 may alternatively have integral laterally projecting wings 42 so as to provide a further example of a grip enhancing member form of actuating protrusion to facilitate rotation of gate 30 to its open position. The wings or other actuating protrusions may be rigid, or may be of, or include, resilient material mounted to the sides of the gate. FIGS. 13a–13d illustrate the use of wings 42 on an embodiment having a swivel mounted eye.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A bullsnap fastener comprising:
   a rigid elongate member having a mid-section,
   a hook having a shank and a curved distal end, said hook extending from a first end of said mid-section so as to define a hook space between said shank and said distal end, and an opening between said distal end of said hook and said first end of said mid-section, an eye extending from a second end of said mid-section generally opposite said first end,
   a rigid gate member pivotally mounted to said mid-section and lying substantially in a plane containing said hook so as to be pivotable between a closed position, wherein an end surface of said gate blocks said opening and closes off said hook space, said end surface extending from said opening to said shank of said hook, generally orthogonally relative to said shank so as to extend across said hook space, and an open position wherein said gate has been pivoted outwardly of said opening, away from said hook, so as to unblock said opening allowing access to said hook space, whereby in said closed position an object in said hook space pressing against said end surface will not urge said gate into said open position against the return biasing force of a resilient biasing means mounted in said mid-section for resiliently biasing said gate from said open position into said closed position,
   at least one grip-enhancing member protruding outwardly of said gate.

2. The fastener of claim 1 wherein said grip-enhancing member is a rigid lever extending in said plane outwardly from said gate, oppositely disposed relative to said end surface of said gate, so as to extend cantilevered outwardly of said gate and said distal end of said hook when said gate is in said closed position.

3. The fastener of claim 2 wherein said lever is nose-shaped.

4. The fastener of claim 3 further comprising grip-enhancing striations formed on an outer surface of said lever.

5. The fastener of claim 1 wherein said grip-enhancing member is a member extending from said gate generally orthogonally outwardly of said plane.

6. The fastener of claim 5 wherein said grip enhancing member is a rigid pin extending through said gate so as to protrude opposite ends of said pin equally from opposite sides of said gate.

7. The fastener of claim 5 wherein said grip enhancing member includes at least one wing-shaped protrusion extending from sides of said gates.

8. The fastener of claim 7 wherein said at least one wing-shaped protrusion is a pair of wing-shaped protrusions mounted in oppositely disposed array on opposite sides of said gate.

9. A bullsnap fastener comprising:
   a rigid elongate member having a mid-section,
   a hook having a shank and a curved distal end, said hook extending from a first end of said mid-section so as to define a hook space between said shank and said distal end, and an opening between said distal end of said hook and said first end of said mid-section, an eye extending from a second end of said mid-section generally opposite said first end,
   a rigid gate member pivotally mounted on a pivot to said mid-section and lying substantially in a plane containing said hook so as to be pivotable between a closed position, wherein an end surface on a distal end of said gate blocks said opening and closes off said hook space, said end surface extending from said opening to said shank of said hook, and an open position wherein said gate has been pivoted outwardly of said opening, away from said hook so as to unblock said opening allowing access to said hook space,
   resilient biasing means mounted in said mid-section for resiliently biasing said gate from said open position into said closed position,
   at least one grip-enhancing member protruding outwardly of said gate and mounted to said gate adjacent said end surface between said end surface and said pivot,
   and wherein said gate does not extend substantially beyond said pivot oppositely from said distal end of said gate.

10. The fastener of claim 9 wherein said grip-enhancing member in a rigid lever extending in said plane outwardly from said gate, oppositely disposed relative to said end surface of said gate, so as to extend cantilevered outwardly of said gate and said distal end of said hook when said gate is in said closed position.

11. The fastener of claim 10 wherein said lever is nose-shaped.

12. The fastener of claim 11 further comprising grip-enhancing striations formed on an outer surface of said lever.

13. The fastener of claim 9 wherein said grip-enhancing member is a member extending from said gate generally orthogonally outwardly of said plane.

14. The fastener of claim 13 wherein said grip enhancing member is a rigid pin extending through said gate so as to protrude opposite ends of said pin equally from opposite sides of said gate.

15. The fastener of claim 13 wherein said grip enhancing member includes at least one wing-shaped protrusion extending from sides of said gates.

16. The fastener of claim 15 wherein said at least one wing-shaped protrusion is a pair of wing-shaped protrusions mounted in oppositely disposed array on opposite sides of said gate.

* * * * *